US009984295B2

(12) United States Patent
Gutierrez et al.

(10) Patent No.: US 9,984,295 B2
(45) Date of Patent: May 29, 2018

(54) METHOD TO PROVIDE A SECURITY TECHNOLOGY AND MANAGEMENT PORTAL

(71) Applicant: Tyco Integrated Security, LLC, Boca Raton, FL (US)

(72) Inventors: Jeffrey Gutierrez, Discovery Bay, CA (US); Phillip William Ponce, Phoenix, AZ (US)

(73) Assignee: Tyco Integrated Security, LLC, Boca Raton, FL (US)

( * ) Notice: Subject to any disclaimer, the term of this patent is extended or adjusted under 35 U.S.C. 154(b) by 0 days. days.

(21) Appl. No.: 15/164,163

(22) Filed: May 25, 2016

(65) Prior Publication Data
US 2016/0275358 A1 Sep. 22, 2016

Related U.S. Application Data

(60) Continuation of application No. 14/604,902, filed on Jan. 26, 2015, now Pat. No. 9,378,633, which is a
(Continued)

(51) Int. Cl.
*G08B 5/22* (2006.01)
*G06F 3/048* (2013.01)
(Continued)

(52) U.S. Cl.
CPC ....... *G06K 9/00771* (2013.01); *G06F 3/0482* (2013.01); *G06F 3/04842* (2013.01);
(Continued)

(58) Field of Classification Search
CPC .......... G06F 21/32; G06F 21/34; G06F 21/35; G06F 21/00031; G06F 21/6218;
(Continued)

(56) References Cited

U.S. PATENT DOCUMENTS 6,747,554 B1 6/2004 Higashimura et al.
6,970,183 B1 11/2005 Monroe
(Continued)

*Primary Examiner* — Firmin Backer
*Assistant Examiner* — Adnan Aziz
(74) *Attorney, Agent, or Firm* — Dean D. Small; The Small Patent Law Group, LLC

(57) ABSTRACT

A method to facilitate management of surveillance devices is provided. The method stores map data defining a geographic map of the monitored region. Assets of interest are located and surveillance devices (SDs) are installed. The method creates and stores surveillance device related (SDR) objects. The method maps the SDR objects to surveillance device specific content that includes at least one of: SD position information, asset position information, SD data and SD documentation. The method determines device markers to be illustrated and maps the device markers to the SDR objects. The method presents a geographic map of the monitored region with device markers. The device markers indicate positions of the surveillance devices relative to the geographic map. The method provides a user interface to permit a user to select from the surveillance devices by choosing the corresponding device markers.

17 Claims, 13 Drawing Sheets

Related U.S. Application Data division of application No. 13/159,217, filed on Jun. 13, 2011, now Pat. No. 8,970,349.

(51) Int. Cl.
| | | |
|---|---|---|
| *G06K 9/00* | (2006.01) | |
| *G08B 13/196* | (2006.01) | |
| *H04N 5/232* | (2006.01) | |
| *G06F 3/0482* | (2013.01) | |
| *G06F 3/0484* | (2013.01) | |
| *G06F 17/30* | (2006.01) | |
| *G06F 21/34* | (2013.01) | |
| *G06F 21/35* | (2013.01) | |
| *G06F 21/32* | (2013.01) | |
| *G06F 21/62* | (2013.01) | |

(52) U.S. Cl.
CPC .... *G06F 17/3087* (2013.01); *G06F 17/30241* (2013.01); *G08B 13/19671* (2013.01); *G08B 13/19682* (2013.01); *H04N 5/232* (2013.01); *G06F 21/32* (2013.01); *G06F 21/34* (2013.01); *G06F 21/35* (2013.01); *G06F 21/6218* (2013.01); *H04N 2201/3253* (2013.01); *Y10S 707/9994* (2013.01); *Y10S 707/99945* (2013.01)

(58) Field of Classification Search
CPC ............ G06F 3/0482; G06F 17/30241; G06K 9/00771; G08B 13/19682; G08B 13/19671; H04N 5/232; H04N 2201/3253
See application file for complete search history.

(56) References Cited

U.S. PATENT DOCUMENTS

| | | |
|---|---|---|
| 7,113,949 B1 | 9/2006 | House et al. |
| 7,305,623 B2 | 12/2007 | Despotidis et al. |
| 7,382,244 B1 | 6/2008 | Donovan et al. |
| 8,013,738 B2 | 9/2011 | Donovan et al. |
| 2002/0057340 A1 | 5/2002 | Fernandez et al. |
| 2004/0263314 A1* | 12/2004 | Dorai ............... G06F 21/32 340/5.2 |
| 2005/0246373 A1 | 11/2005 | Faulkner et al. |
| 2006/0078047 A1* | 4/2006 | Shu ............... G06F 17/3079 375/240.01 |
| 2007/0268121 A1 | 11/2007 | Vasefi et al. |
| 2008/0109883 A1 | 5/2008 | Hernoud et al. |
| 2009/0167862 A1 | 7/2009 | Jentoft et al. |
| 2010/0246669 A1 | 9/2010 | Harel |
| 2011/0288895 A1 | 11/2011 | Perez, Jr. et al. |
| 2013/0030875 A1* | 1/2013 | Lee ............... G06Q 10/06311 705/7.38 |

* cited by examiner

US 9,984,295 B2

METHOD TO PROVIDE A SECURITY TECHNOLOGY AND MANAGEMENT PORTAL

CROSS REFERENCE TO RELATED APPLICATIONS

This application is a continuation of U.S. application Ser. No. 14/604,902, filed Jan. 26, 2015, which is incorporated by reference in its entirety. U.S. application Ser. No. 14/604,902 is a divisional of, and claims priority to U.S. patent application Ser. No. 13/159,217, filed Jun. 13, 2011, (now U.S. Pat. No. 8,970,349, issued Mar. 3, 2015) which is hereby incorporated by reference in its entirety.

BACKGROUND OF THE INVENTION

The subject matter herein relates generally to systems and methods to facilitate management of surveillance devices that are distributed over a monitored region.

Numerous surveillance systems exist today that include a large number of surveillance devices distributed over a wide area. The surveillance devices may generally include video equipment, still images cameras, motion monitoring equipment, temperature sensors, water sensors and the like which collect data (video, images, etc.) for storage in a database or digital video recorder (DVR).

More recently, municipal services and agencies have become interested in having surveillance devices installed over all or portions of region(s) for which the municipality or agency is responsible. For example, police departments are having security cameras installed on highways and at intersections to monitor whether vehicles comply with speed limits and stop lights. Utility companies are becoming interested in having cameras and other monitoring equipment installed to monitor utility property (e.g., power grids, power stations, water treatment equipment, sewage systems, etc.). The surveillance devices are installed on or at desired locations relative to property owned, leased or controlled by the municipal service and/or agency. The surveillance devices are coupled to network devices that transmit recorded surveillance data to the desired storage equipment.

Heretofore, numerous separate and independent companies and services were contracted by the municipality or agency to monitor, manage and maintain the various types of equipment within the surveillance system. For example, one company may be engaged to install part or all of the devices, while a separate company may be engaged to perform maintenance. A third company may be hired to manage operation of video devices and storage of video on DVRs, while a separate fourth company was hired to manage operation of the network communications devices that conveyed the collected data to storage equipment. A separate company may be hired to manage operation of non-video surveillance equipment, such as motion sensors, speed guns, still image cameras and the like.

In the past, installation engineers have experienced problems when determining where specifically to install surveillance devices. The engineer's base installation on source plan documents that show the locations of property (e.g., utility poles, etc.) on which the surveillance devices are to be installed. However, the installation engineer may arrive at an installation site only to learn that they do not have complete or correct information regarding the property and where the security and network equipment is to be installed. For example, when a camera is to be installed on a utility pole, the utility pole may not be at the particular coordinates where the installation engineer expected it. Also, the engineer may arrive at a location without all of the necessary source documentation needed to complete installation (e.g., no engineering drawings, specifications for the wrong security device, invalid network operating parameters (channel or frequency settings) that do not link to other existing devices, and the like. Once a security device is installed, there is no convenient manner by which the engineer can enter the exact coordinates of the security device in connection with the source plan documents showing the utility property.

In the past, maintenance engineers have also experienced problems in determining which specific equipment to repair or perform periodic maintenance upon. The maintenance engineer may arrive at a site where the equipment is thought to be installed, only to learn that the equipment is not at the expected specific location. For example, an engineering drawing of the region may show a camera to be on a utility pole located on one side of a street or located at one corner of an intersection. However, when the engineer arrives to perform the maintenance, they may learn that the only camera in the area is on the opposite side of the street or at a different corner of the intersection. This causes problems and confusion as to whether they are at the correct location or if the drawings are simply incorrect.

Moreover, as city wide wireless video systems are being engineered, deployed, and managed, comprehensive documentation is not being created. The documentation being created also may not be complete as to the system architecture. For example, the documentation is not maintained, nor updated, for a complete system design extending from start to finish, nor covering snap shot detail layouts in graphic displays. Instead, each separate company or service provider creates and/or maintains only documentation related specifically to their corresponding subset of responsibilities. For example, the company overseeing the network management sub-system only creates and maintains documentation regarding the communications sub-system. Other companies only create and maintain documents regarding the products that they install, maintain or manage. Manufacturers of individual devices do not create, nor maintain, system wide documents, while integration service providers do not create, nor maintain, product specifications.

Hence, multiple separate documents exist that describe only limited portions of an overall system. The source plan or engineering documents, that describe the property locations, do not contain information about the surveillance devices. Specifications for the surveillance devices are not correlated to the particular physical location of the surveillance device in the monitored region. Warrantee and service records are not correlated with the particular physical location of the surveillance.

A need remains for a system that correlates physical locations of devices to a map, identifies each device, illustrates communications paths, presents system status information, enables remote control over the devices and affords ready access to specifications, warrantee and service records.

BRIEF DESCRIPTION OF THE INVENTION

In one embodiment, a system to facilitate management of surveillance devices that are distributed over a monitored region, through a geographic information (GI) portal, is provided. The system has GI storage to store map data defining a geographic map of the monitored region in which assets of interest are located and surveillance devices (SDs)

are installed relative to the assets of interest. A GI manager unit (GIMU) is provided to create and store surveillance device related (SDR) objects in the GI storage, each of the SDR objects is uniquely associated with one of the SDs, the GIMU maps the SDR objects to surveillance device specific content. The surveillance device specific content includes at least one of: the SD position information regarding a location of the corresponding surveillance device in the monitored region; the asset position information regarding a location for the corresponding asset with respect to which the SD is installed; the SD data collected by the corresponding SD; and/or the SD documentation describing at least one of installation, operation and maintenance of the corresponding SD. A display presents a geographic map of the monitored region with device markers illustrated thereon. The device markers indicate positions of the surveillance devices relative to the geographic map, with the device markers mapped to the SDR objects. A user interface permits a user to select from the surveillance devices by choosing the corresponding device markers. The GIMU makes the device content associated with the SDR object for the selected surveillance device available to the user.

In another embodiment, a method is provided to facilitate management of security devices that are distributed over a monitored area, through a geographic information (GI) portal, the method stores map data in a GI storage. The map data defines a geographic map of the monitored region in which assets of interest are located and surveillance devices (SDs) are installed relative to the assets of interest. The method creates and stores surveillance device related (SDR) objects in the GI storage, each of the SDR objects uniquely associated with one of the SDs. The method further maps the SDR objects to surveillance device specific content that includes at least one of: the SD position information regarding a location of the corresponding surveillance device in the monitored region; the asset position information regarding a location for the corresponding asset with respect to which the SD is installed; the SD data collected by the corresponding SD; and/or SD documentation describing at least one of installation, operation and maintenance of the corresponding SD. The method presents, on a display, a geographic map of the monitored region with device markers and network links illustrated thereon. The device markers indicate positions of security devices relative to the geographic map, with the device markers mapped to the SDR objects. The method permits the user to select, through a graphical user interface, from the surveillance devices by choosing the corresponding device markers. The method makes device content associated with the SDR object for the selected surveillance device available to the user.

In an embodiment, a system to facilitate management of network devices, that are distributed over a monitored region, through a geographic information (GI) portal, is provided having GI storage to store map data defining a geographic map of the monitored region in which assets of interest are located and network devices (NDs) are installed relative to the assets of interest. A GI manager unit (GIMU) is provided to create and store network device related (NDR) objects in the GI storage, each of the NDR objects uniquely associated with one of the NDs, the GIMU mapping the NDR objects to network device specific content. The network device specific content to include at least one of: the ND position information regarding a location of the corresponding network device in the monitored region; the asset position information regarding a location for the corresponding asset with respect to which the ND is installed; the ND data collected by the corresponding ND; and/or the ND documentation describing at least one of installation, operation and maintenance of the corresponding ND. A display presents a geographic map of the monitored region with device markers and network links illustrated thereon. The device markers indicate positions of the network devices relative to the geographic map, the network links illustrating communications paths between network devices, the device markers and network links mapped to the NDR objects. A user interface permits a user to select from the network devices or network links by choosing the corresponding device markers or network links. The GIMU makes available to the user, the device content associated.

DETAILED DESCRIPTION OF THE INVENTION

In accordance with embodiments herein, systems and methods are provided that afford real time "in the cloud" managed data. Cameras and other surveillance devices are positioned throughout a monitored area on assets such as public utility/city owned poles and buildings. A network is created to connect the surveillance devices to a central, single location from which real time events are managed. The network may be changed constantly, and accordingly, the systems and methods provided herein enable such changes to be documented easily. The systems and methods provided herein also ensure centralized control over changes to the network and to the documentation describing network changes. The systems and methods provided herein gather data for every architectural layer and enable input of such data to a common storage and provide search tools are able to readily and quickly search the storage for desired information. The systems and methods provided herein afford administrative controls over the documentation to avoid mistakes. For example, the data, controlled by engineers and service organizations, may be placed on a server that is accessible by individuals who may need to utilize these documents, thereby ensuring central control over the data.

By way of example, customers may include city, state, and/or county services who utilize embodiments hereof as a centralized system to monitor equipment and other asserts that are scattered over a wide area. Emergency management services may also utilize embodiments hereof to monitor emergency systems. Other examples of service customers may include any public or private entity that has assets deployed over a large area or has a large number of assets that warrant monitoring. Embodiments hereof may be used to facilitate management of, among other things, warranty dates, service schedules, maintenance histories and the like. Embodiments described herein avoid the need to make multiple revisions of paper documents, and instead afford a paperless document management system with up-to-date revisions and the ability to send and receive documents to all or multiple participants in very little time. Optionally, customers may be charged for edits made to documents or changes to the system.

Figure 1:
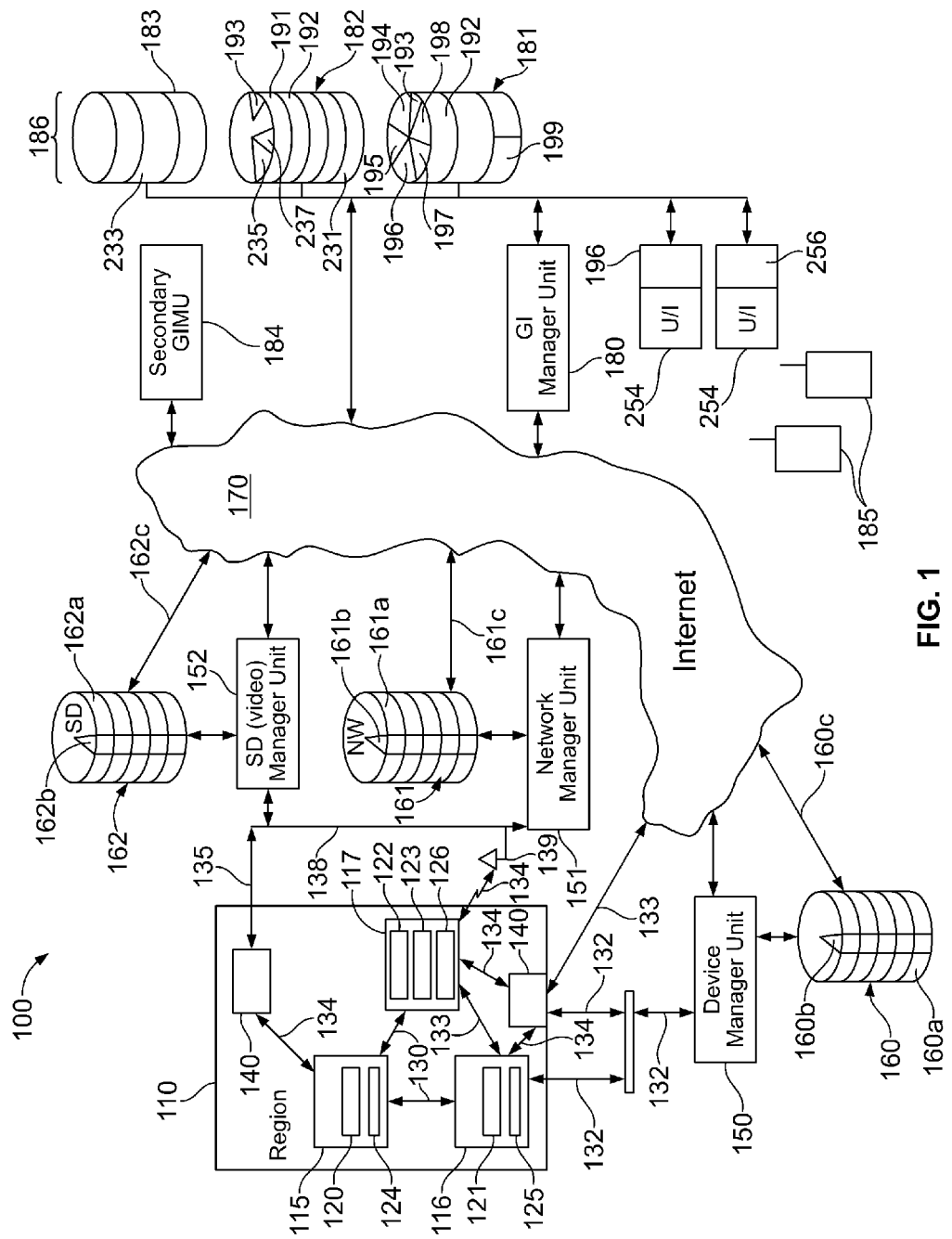
FIG. 1 illustrates a system formed in accordance with an embodiment of the present invention.

FIG. 1 illustrates a system formed in accordance with an embodiment of the present invention. The system 100 facilitates management of surveillance devices 115-117, that are distributed over a monitored region 110. The system 100 utilizes a geographic information (GI) portal to facilitate device and document management.

The system 100 comprises GI storage 186 that store various types of data, objects, and the like. The GI storage 186 may be located at one location or multiple locations that are interconnected over the internet or operated as a cloud network of storage space. For example, the GI storage 186 may be all or partially on a $3^{rd}$ party server that leases space to users. The GI storage 186 includes one or more storage devices 181-183, that may be similar types of storage or different types of storage. For example, the storage devices 181-183 may be servers, flash drives, RAM, ROM, disc, RAID, and the like.

The system 100 accumulates documentation describing multiple different layers of information. The layers include a base layer, an asset or property layer, a surveillance device layer, a network layer, a maintenance layer, an operational layer, and the like. The base layer includes map data describing a geographic map of the region. The asset layer includes documents that describe each asset of interest to the customer (e.g., municipality, service private business, etc.), including the asset GPS coordinates or position, the asset type, asset attributes and the like. The surveillance device layer contains documents that describe the devices, including installation manuals, specifications, operation parameters, device attributes, warrantee and the like. The network layer contains documents that describe the network devices, including installation, specification, operation parameters, network attributes, warrantees and the like. The maintenance layer includes information that describes the maintenance history for the devices, network, and assets. The operational layer includes information that describes the status, condition and operating parameters of the devices and network.

The monitored region 110 may represent all or a portion of a state, county, city, community, and/or other metropolitan area. The monitored region may correspond to all or a portion of a region of interest to a public service, such as a fire department district, a police district, a water or sewage district, an electrical utility grid, college campus, school grounds, school district- and the like. Optionally, the monitored region may represent a region of private interest to a commercial business, such as an office campus, a manufacturing plant, a mine, a drilling rig, a number of buildings owned or operated by a business and the like. The region of interest may not be one contiguous area, but instead may include multiple separate physical areas.

The monitored region 110 includes assets 115-117 that are distributed across the monitored region 110. Assets 115-117 will vary depending upon the nature of the customer enterprise. The assets may represent any type of physical property, equipment, or structure that is owned, leased or otherwise available for use by a customer of the system 100. For example, the assets 115-117 may include utility poles, traffic light structures, tunnels, water pumps, electrical transformers, power stations, power lines, storm sewers, road intersections, highway segments, railroad segments, railroad switching stations, buildings, manufacturing plants, power plants, warehouses, residential homes, drilling rigs, mines, vehicles, and the like.

A collection of surveillance and network devices 120-126 are positioned at desired locations throughout the monitored region 110. The type of devices will vary based on the type of monitored region and user. For example, the surveillance and network devices 120-126 may include video cameras, still image cameras, audio recorders, motion sensors, temperature sensors, water sensors, gas sensors, security sensors, switches, and other surveillance related devices. The surveillance devices 120-123 collect surveillance device content such as video, still images, audio, temperature data, motion data, switch state, environmental conditions and other data. As one example, a network device 124-126 may be located at each asset 115-117, while one or more surveillance devices 120-123 may also be located at each asset 115-117. The surveillance devices 120-123 are communicatively coupled to the network devices 124-126 such that data, commands, status, conditions and other information may be passed bi-directionally there between. In the example of FIG. 1, the surveillance device 120 bi-directionally passes data, commands, status and other information through the network device 124 to the overall network. The surveillance device 121 bi-directionally passes surveillance device content data, commands, status, conditions and other information through the network device 125 to the overall network. The surveillance devices 122-123 bi-directionally pass surveillance device content data, commands, status, conditions and other information through the network device 126 to the overall network.

The network devices 124-126 may communicate over various wired and/or wireless links 130-138 bi-directionally transmit to surveillance device content and network device content. The links 130-138 may be one type, a subset of types or all may be used in one implementation. The network devices 124-126 communicate with one another over device to device links 130. The network devices 124-126 communicate with manager units 150-152 over one or more types of links, such as a local area or wide area network (LAN or WAN) link 132, a wireless link 134 to a cellular tower 139, an internet link 138 and the like. The network devices 124-126 may communicate with routers 140 that, in turn, are connected, over router links 135, to a LAN, a WAN, the internet and the like. The device manager unit (DMU) 150 may communicate over a LAN or WAN link 132 with different network devices 124-126, while network manager unit (NMU) 151 communicates over a cellular link 134 with different network devices 126. A surveillance device (SD) unit 152 may communicate over link 135 through router 140 with different network devices 124 and 126. One example of the surveillance device may be a video or still image camera, and thus item 152 is also referred to as VMU or SD manager unit. While not shown, each of the network devices 124-126 may be configured to communicate with each of the device manager units 150-152.

The links 130-138 between the network devices 124-126 and the manager units 150-152 may be through various intermediate equipment. The network devices 124-126 may represent wired or wireless communications equipment that are configured to utilize various transmission medium, such as different ranges of the radio frequency spectrum, microwave spectrum, optical transmissions, satellite transmissions, and the like. The network devices 124-126 may include RF transceivers to transmit and receive RF transmissions. The network devices 124-126 may include cellular transceivers to transmit and receive utilizing cellular towers and protocols. The network devices 124-126 may include equipment that communicates based on line-of-sight transmissions such as with GPS systems. The surveillance and network devices 120-126 may be tunable to different channels, frequency spectrums and the like. The network devices 124-126 may include memory to temporarily buffer data, commands, status, and other information generated by the security device(s) 120-123.

The SD manager unit (VMU 152) monitors, maintains and manages video related surveillance devices 120-123. For example, the VMU 152 may monitor and/or receive surveillance device content, such as streaming video and/or still images from cameras located throughout the monitored region 110. The VMU 152 may adjust the status (e.g., condition, direction, zoom, camera settings) and other characteristics of the cameras. The VMU 152 may determine and change which digital video recording (DVR) equipment receive video data from a camera. The VMU 152 also manages operation of the DVR equipment.

The NMU 151 monitors, manages and maintains the network devices 124-126. For example, NMU 151 monitors various characteristics related to transmissions between the network devices 124-126 as well as communication to and from the network devices 124-126 and other network equipment. For example, the monitor characteristics may include signal strength, bandwidth usage, unused bandwidth, and the like. The NMU 151 may adjust the status, conditions and other characteristics of the network devices 124-126. For example, the NMU 151 may take an individual network device on-line or off-line. Also, the NMU 151 may change which network devices communicate directly with one another. The NMU 151 may also readjust bandwidth and/or the number of channels permitted to be used by each network device 124-126.

The NMU 151 communicates with the network devices installed in the monitored region. The NMU 151 collects network device content (including status, and condition data) from the network devices and records the network device content (including status and condition data) in the NW database 161. The NMU 151 communicates with the network (NW) database 161 to manage and maintain network device content stored in the NW database 161. Among other things, the NMU 151 may update the NW database 161 with NW position information or tags 161B associated with each network device 124-126 to identify the physical location or GPS coordinates of the network device 124-126 within the monitored region 110. By way of example, the NW database 161 may be organized into multiple segments of network-related content 161*a*, each of which is associated with a corresponding network device 124-126. The network-related content 161*a* may contain and map together various types of information, such as specification documents, addressing information, unique name and identification information, service history and records and the like. The NW database 161 may map NDR objects to network device content that includes at least the following i) ND position information regarding a location of the corresponding network device in the monitored region, ii) asset position information regarding a location for the corresponding asset with respect to which the ND is installed, iii) ND data collected by the corresponding ND, and iv) ND documentation describing at least one of installation, operation and maintenance of the corresponding ND.

The device manager unit (DMU) 150 monitors, maintains and manages other types of devices, which may not be considered video or network related devices. For example, the DMU 150 may manage various security sensors, switches, locks and the like. The DMU 150 communicates with the surveillance devices installed in the monitored region. The DMU 150 collects security, status, and condition data from the surveillance devices and records the security, status and condition data in the device database 160. The DMU 150 interacts with a device database 160 to store device data, as well as status, condition information and the like. The device database 160 may also store various documents related to the devices managed by the DMU 150. The device database 160 may be organized into multiple segments of content 160*a* that include, among other things, position information or tags 160*b* that identify the physical location (e.g., intersection or GPS coordinates) of the corresponding device. The device database 160 and the DMU 150 also communicate with the internet (as illustrated by the links 170.)

Each of the manager units 150-152 and databases 160-162 may be coupled to the internet, as indicated by the various connections to 170. The database links 160*c*-162*c* affords direct access to the content of the databases 160-162 by other manager units coupled to the internet through cloud 170. For example, remote devices such as the GI manager unit 180 may directly access the databases 160-162 to obtain records and/or data therefrom. Alternatively, the GI manager unit 180 may request, from the corresponding manager unit 150-152, a particular type of information, such as data, records and the like, which are then obtained by the corresponding manager unit 150-152 from the corresponding database 160-162.

The security data (SD) database 162, network (NW) database 161 and device database 160 are maintained and managed by one or more independent management units, such as DMU 150, NMU 151 and VMU 152. The DMU 150, NMU 151 and VMU 152 maintain and manage the device, SD and NW databases 160-162 separately from the GI storage 186. For example, the SD database 162 may store surveillance device content such as images, video data, and other types of security data, as well as status and condition information regarding the corresponding surveillance devices. The SD database 162 stores device-related content 162*a* associated with SDs installed throughout the monitored region. The device-related content 162*a* includes attributes that define operation, performance and capabilities of the corresponding devices. The database 162 stores objects associated with surveillance devices installed throughout the monitored region, the objects including attributes that define operation, performance and capabilities of the corresponding surveillance devices. The SDR objects 162b are mapped to surveillance device content such as i) SD position information regarding a location of the corresponding surveillance device in the monitored region, ii) asset position information regarding a location for the corresponding asset with respect to which the SD is installed, iii) SD data collected by the corresponding SD, and iv) SD documentation describing at least one of installation, operation and maintenance of the corresponding SD.

The GI storage 186 stores, among other things, map data 191 defining a geographic map of the monitored region 110. The GI storage 186 stores SD and ND content 192 such as data, documents, status, condition, coordinates and other information in connection with the various layers (e.g., base, asset, device, network, and surveillance layers). The GI storage 186 is managed by a GI manager unit (GIMU) 180 to facilitate management of the surveillance and network devices and links. The GIMU 180 manages storage of the various content 192 and information in an object oriented architecture that correlates each surveillance and network device to an object 193 which is then mapped to content 192, such as a device physical location 194, an asset location 195, video/image content 196, data 197, documents 198, status 199, condition and other information. For example, the GIMU 180 may store certain types of information and documents 231 in the GI storage 186 that is obtained during installation of assets, and then add other content during installation of surveillance and network devices, and other information and documents thereafter. The map data, device related content and other information are periodically accessed for updating within the GI storage 186 and to be provided when selected by users at the user interfaces 254 and at portable wireless devices 185.

The GIMU 180 records, in the GI storage 186, asset position information 233 (e.g., coordinates) regarding locations of assets 115-117 that are of interest within the monitored region 110. The GIMU 180 accesses SD database 162 to obtain device-related content 162a. The GIMU 180 stores all or portions of the device-related content 162a in the GI storage 186. The device-related content 162a is mapped to SDR objects 235 associated with the surveillance devices 120-123 installed in the monitored region 110. The device-related content 162a may include position information or tags 237 to the objects 235, identifying a location of the corresponding surveillance devices 120-123 in the monitored region 110. The device-related content 162a may include documents and attributes that define operation, performance and capabilities of the corresponding surveillance devices. The attributes may represent device identification information, device-generated content, device-status information, device-service history, and the like.

The GIMU 180 also accesses the NW database 161 to obtain network-related content 161a for network devices 124-126 that are of interest. The GIMU 180 stores the network-related content 161a in the GI storage 186. The network-related content 161a and position information or tags 161b, that identify a location of the corresponding network devices 124-126 that are installed over the monitored region 110, are mapped to NDR objects 193. The network-related content 161a includes documents and attributes that define operation, performance and capabilities of the corresponding network devices. The attributes include network device identification information, network device-generated content, network device-status information and network device-service history.

The GI storage 186 stores as content 192, among other things, identity information about each surveillance and network device, such as camera name, type, number, IP address, a last viewing direction, a description of the street or intersection at which the device is located, MAC address, radio node number, ON/OFF time, ON/OFF status, signal strength, last service date, preset views, present view, utility pole number, pole type and the like, all of which are examples of surveillance and network device content. The GI storage 186 also stores, as content 192, source documents associated with the monitored region 110, the assets 115-117, and the devices 120-126. The source documents may include one or more of documents used by emergency services personnel, water services, sewage services, waste management, utilities and engineering personnel, all of which are examples of surveillance and network device content. For example, these documents may include engineering drawings or a floor plan for one or more buildings and/or physical plans for assets 115-117 in the monitored region 110 (e.g. a pole plan, a power line grid diagram, water line plan, engineering diagrams, and the like). These documents may include engineering documents, assembly documents regarding how to install devices, device specifications, and the like. Device-related documents may contain device specific information about a corresponding type of device, including device specification, operational parameters, maintenance information, installation instructions and repair information. Network-related documents may contain information about a corresponding type of network device, including device specification, cooperational parameters, maintenance information, installation instructions and repair information.

The system 100 includes one or more user interfaces 254 that each includes a display 256. The display 256 presents to a geographic map of the monitored region 110 where the map is overlaid with indicia representing surveillance device markers, network device markers and network links to for a geographic information portal. The device markers indicate position, direction, field of view, type and status of the surveillance devices 120-123 relative to the geographic map. The network link indicia indicate status of communications links between network devices, a direction of communication, the status of the link, and the like. The user interface 254 permits a user to select from the network devices, surveillance devices and network links. The GIMU 180 makes available to the user the link and device related content for the selected device or link. The GIMU 180 accesses stored content based on selections by the user at interface 254 to display various information to the user. Examples of GUI displays are shown in FIGS. 2-8 for the GI portal.

Figure 2:
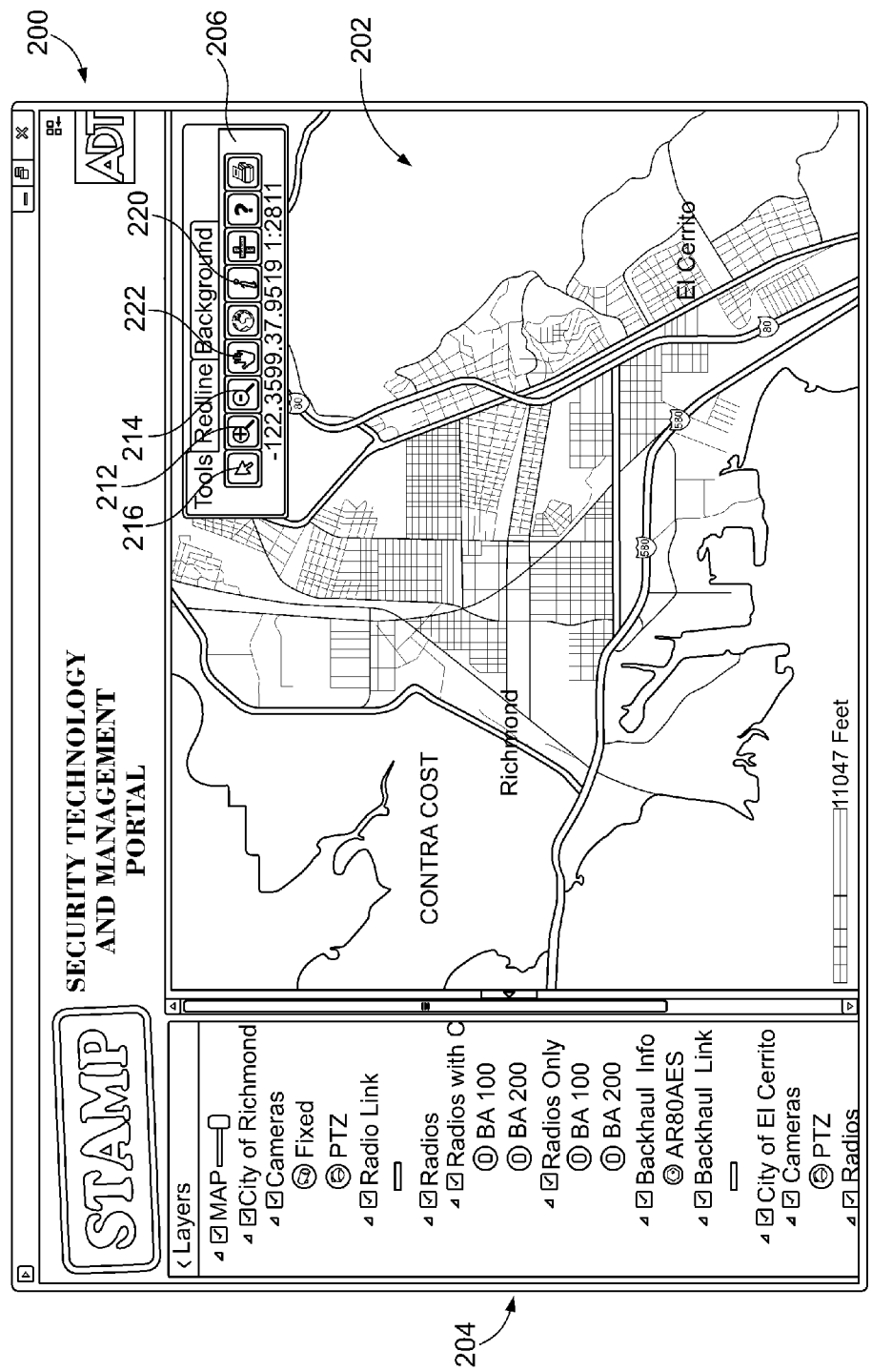
FIG. 2 illustrates a screen shot of a window presented on the user interface of FIG. 1.

FIG. 2 illustrates a screen shot of a window 200 presented on the user interface 195. The window 200 includes a map area 202, a network control area 204, and a map tool bar 206. The map area 202 illustrates a geographic map 210 of all or a portion of the monitored region 110. The geographic map 210 illustrates roads and other geographic landmarks within the monitored region 110. The map tool bar 206 includes a variety of icons that may be selected to adjust the displayed portion of the geographic map 210 such as the zoom icon 212, pan out icon 214, select icon 216, device identity icon 220, pan icon 222 and the like. The device identity icon (DII) 220 is selected to obtain detailed information about a particular device. The zoom icon 212 and pan out icon 214 are used to adjust the displayed portion of the map. The select icon 216 is used to mark a device of interest. When the pan icon 222 is selected, the user is able to pan to different areas of the map that are not yet visible on the display by clicking and dragging.

The network control area 204 may be switched between different control menus, namely a layer menu, a tools menu and a search menu. The network control area 204 in FIG. 2 is shown with the "layer" menu selected. In the layer menu, a layer structure is presented that includes one or more outer and sub-layers. For example, the outer layer may designate different geographic sub-regions such as cities, counties, municipal zones, campuses, etc. Below the outer layer, one or more sub-layers are presented for different types of equipment within the network architecture. For example, the equipment sub-layer may include a camera sub-header, a radio-link sub-header, a backhaul information sub-header and a backhaul link sub-header. The camera sub-header may have one or more sub-categories of devices, such as for fixed cameras, still cameras, PTZ (pan-tilt-zoom) cameras and the like. The radio link sub-layer may list each radio link available (on-line or off-line) in the network. The radio sub-layer includes another sub-layer that separates "radios with cameras" from "radios only" (without cameras). The "radios with cameras" sub-header then lists each radio by a unique ID (e.g., BA100, BA200, etc) that is connected to a camera. The "backhaul information" sub-header identifies each network device used to convey the backhaul information. The "backhaul link" sub-header indicates the status of the backhaul link, such as signal quality, capacity used, capacity available, etc.

By navigating through the architecture layers in the network control area 204, the user is able to access different information in the architecture of the network, including each device therein and each communications link. The user is then afforded the option to select individual devices and obtain a large amount of information regarding the selected device(s).

Figure 3:
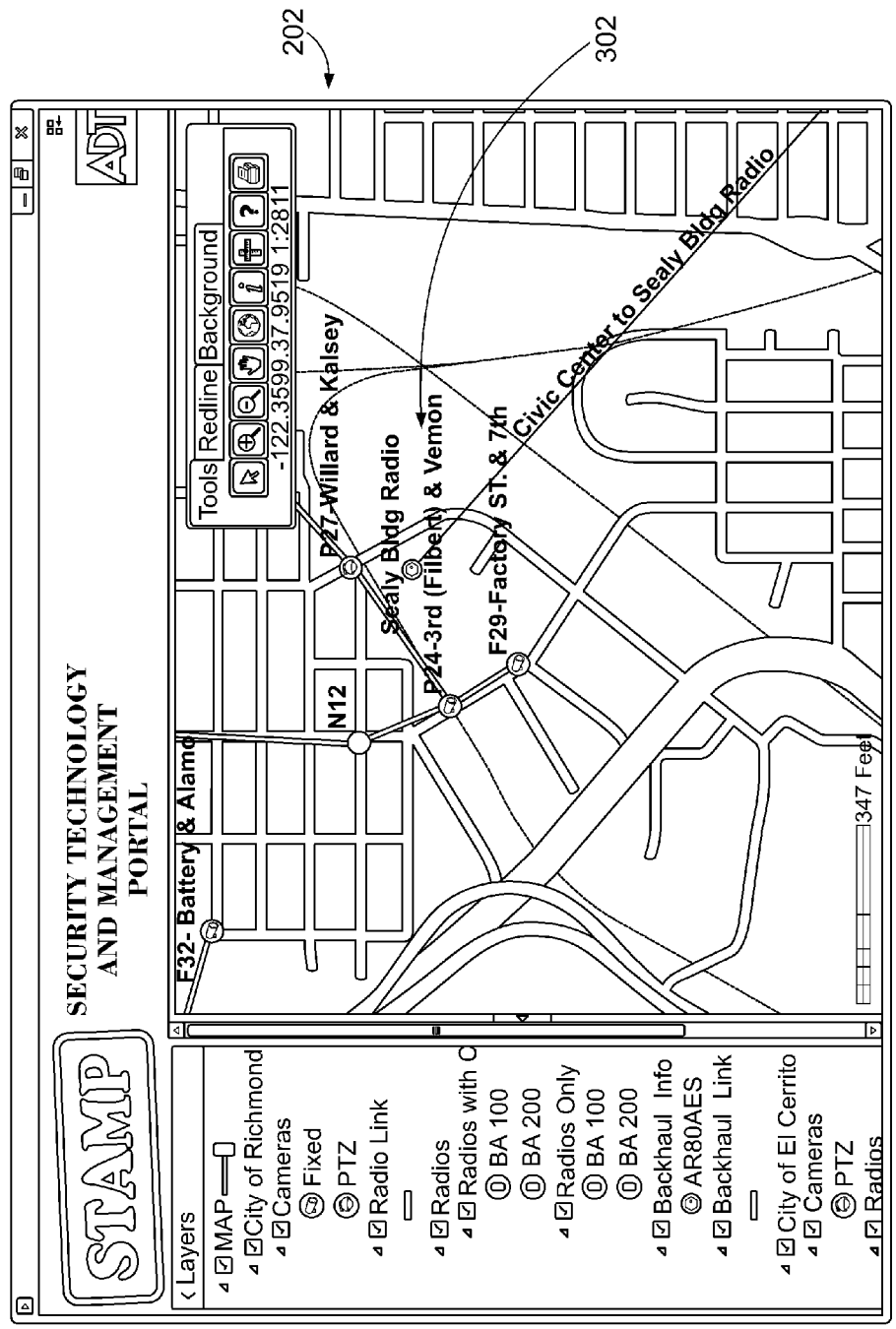
FIG. 3 illustrates the window of FIG. 2 with the geographic map zoomed in closer to a particular monitored sub-region in accordance with an embodiment of the present invention.

FIG. 3 illustrates the window 200 with the geographic map zoomed in closer to a particular monitored sub-region 302. The map area 202 illustrates surveillance and network devices that are located in the sub-region 302. The sub-region 302 illustrates a group of cameras that are individually labeled with unique IDs, namely F32, F29, P24, and P27. Information is added next to each camera name, such as the intersection where the camera is located (e.g., camera F29 is at the intersection of Factory Street and 7$^{th}$ Street). The sub-region 302 also illustrates nodes such as N12 where a repeater radio may be located. The sub-region 302 also illustrates and labels radios located at buildings (e.g., Sealy Bldg Radio).

The sub-region 302 also illustrates communications links between equipment. The communications links may be shown in different colors, line thicknesses, line types, etc., to indicate the type of link. For example, a thick blue line may be shown for communications links of one type. A thin red line, dashed line, etc. may be shown for communications links that are a different type. For example, a thick blue line is shown between the cameras F29 and P24, between the cameras P24 and P27, and between camera P24 and node N12. Thick blue lines for other links are also shown to extend from node N12 off the edge of the viewable portion of the map, as well as from camera F23 off the edge of the viewable portion of the map and from camera P27 off the edge of the viewable portion of the map.

A communications link is shown as a thin red line extending from the Sealy Building Radio off the edge of the map. The link is shown in a thin red line from the Sealy Building Radio to indicate that this link is a different type. The user may select a radio by choosing the radio from the network control area 204 or by double-clicking on the node in the map. Once the radio is chosen, a pop up window is presented to permit the user to change a state of a radio between off-line and on-line by toggling a corresponding status flag.

Figure 4:
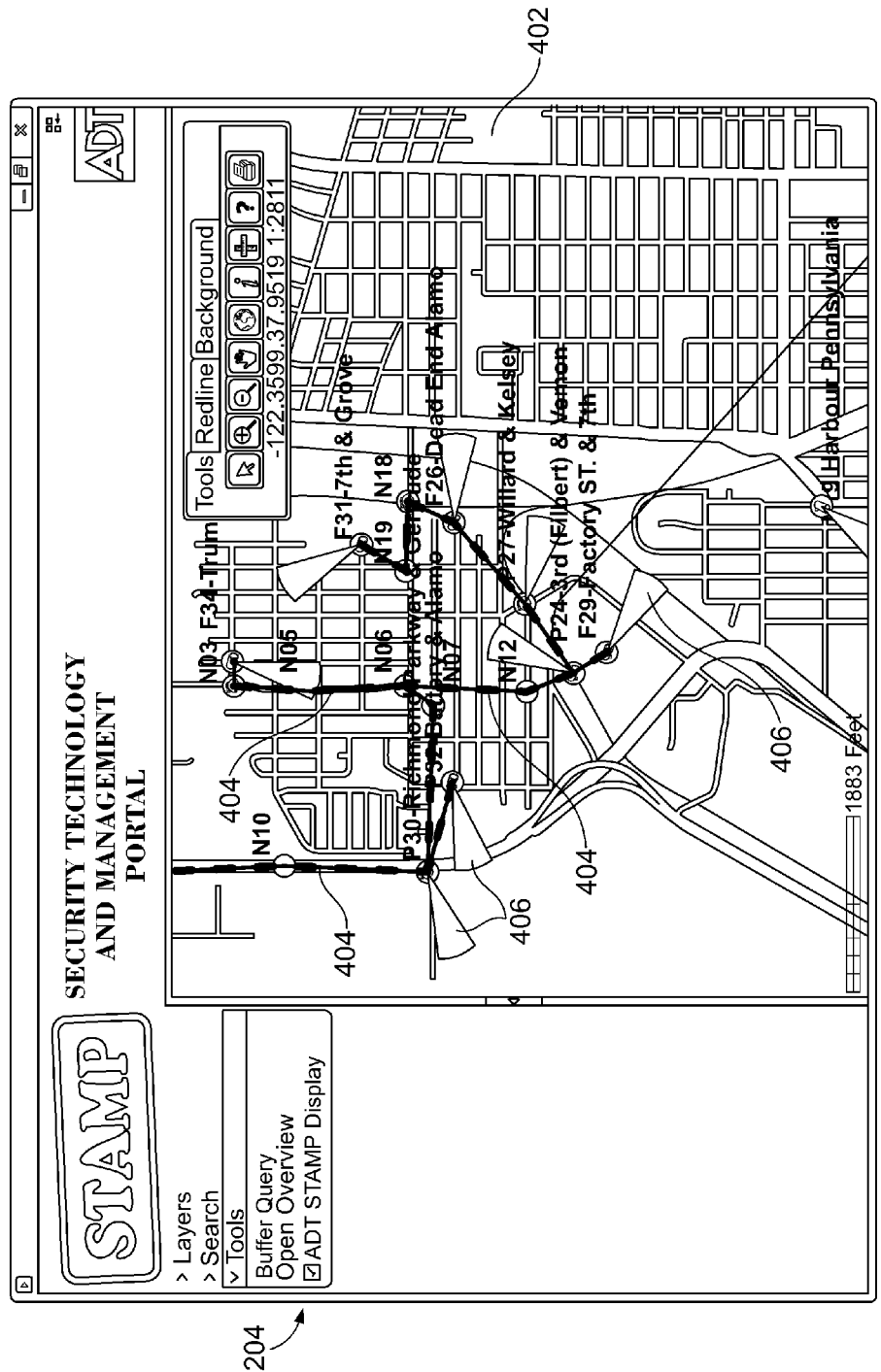
FIG. 4 illustrates a window with the geographic map zoomed to a monitored sub-region in accordance with an embodiment of the present invention.

FIG. 4 illustrates the window 200 but with the geographic map zoomed to a monitored sub-region 402. The sub-region 402 includes a group of nodes having cameras and radios. The window 200 includes communications link status (CLS) indicia 404 extending between the radios that are bi-directionally communicating with one another. The CLS indicia 404 indicates a status of a communications link, such as on-line, off-line, experiencing non-fatal errors, operating at least partially outside of parameter limits, and the like. For example, when two radios are on-line and the communications link is operating within acceptable limits, the CLS indicia 404 may be shown as a thick blue/green dashed line with the dashes moving in the direction in which communications are traveling. Alternatively, when a radio is off-line and/or is operating outside system parameter limits, the CLS indicia 404 changes to reflect this status change.

The window 200 illustrates camera condition (CC) indicia 406 associated with each camera. The CC indicia 406 may indicate the direction in which each camera is pointed with respect to the geographic map. For example, the camera at node P30 is directed substantially to the west, while the camera at F28 is directed substantially to the east. The camera at node F81 is directed to the northwest and conveys video data to the Sealy Building Radio via communicates links between radios at nodes N19 and N18, F28 and F27. The CLS indicia 404 and CC indicia 406 are turned on and off by selecting the "tools" layer in the network control area 204.

Figure 5:
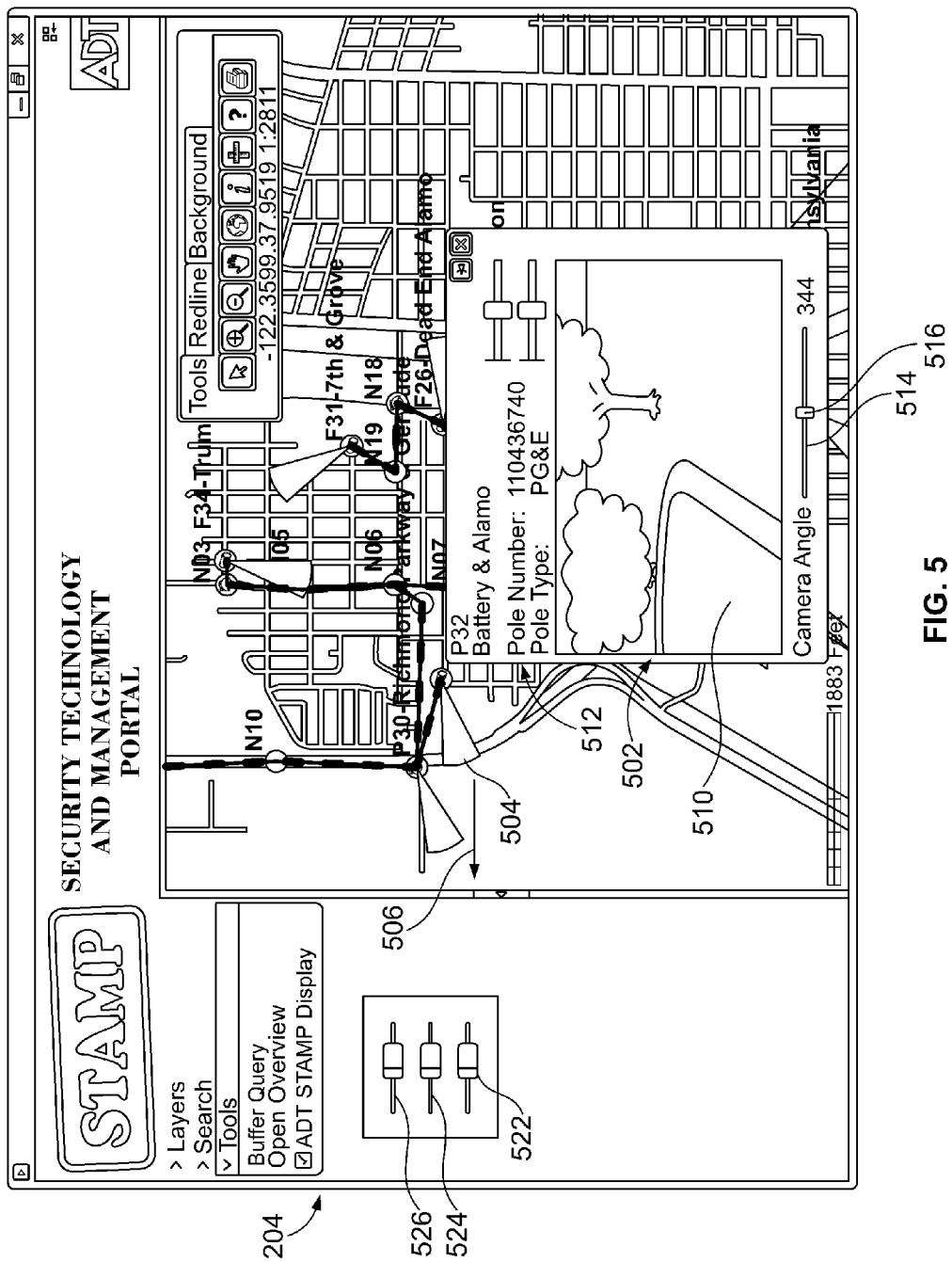
FIG. 5 illustrates a map with a video pop up screen overlaid thereon for a selected camera in accordance with an embodiment of the present invention.

FIG. 5 illustrates the map 202 with a video pop up screen 502 overlaid thereon for a selected camera at node P32. The user may select the camera at node P32 by clicking on the node in the map or by clicking on the camera name in the network control area 204. Optionally, the screen 502 may pop up when the user hovers a "mouse" icon over a particular node. The video pop up screen 502 shows a real-time video 510 or still image of the current video/image data generated by the camera along with header information 512. The CC indicia 504 illustrates a cone extending the direction 506 in which the camera is directed, thereby facilitating the user's understanding of what area is within the cameras field of view that is shown in the video pop up screen 502. The CC indicia 504 may have a dark border to denote a fixed camera or lack dark border to denote a camera with pan-zoom-tilt.

When the camera is a pan-zoom-tilt (PZT) type camera, the user may select the camera by clicking on the node and then change the pan, zoom and/or tilt thereof through device operation fields. The video pop up screen 502 may include a camera direction slide bar 514 below the video area. The user may click and drag the tab 516 for the camera direction bar 514 which causes the camera to be rotated. Optionally, the video pop up screen 502 may also include a zoom control bar 518 and a tilt control bar 520. When the user clicks and drags the tabs in the zoom and/or tilt control bar 518 and 520, this causes the cameras to zoom and tilt, respectively.

Optionally, the network control area 204 may include pan, zoom and tilt set fields 522, 524 and 526, in which a number may be entered of tab slid for each by the user. For example, if the zoom range is from 1 to 10, the user may enter a desired amount of zoom by entering a number between 1 and 10. Similarly, the tilt range may be 0 to 180 degrees, where the user enters a number corresponding to the desired degree tilt from a vertical or horizontal reference plane. The pan range may be 0 to 360 degrees, where the user enters a number corresponding to the desired angular orientation about a vertical axis and from a zero reference angle. Optionally, the user may be afforded a field on the screen where numeric values are entered to set the PZT.

Figure 6:
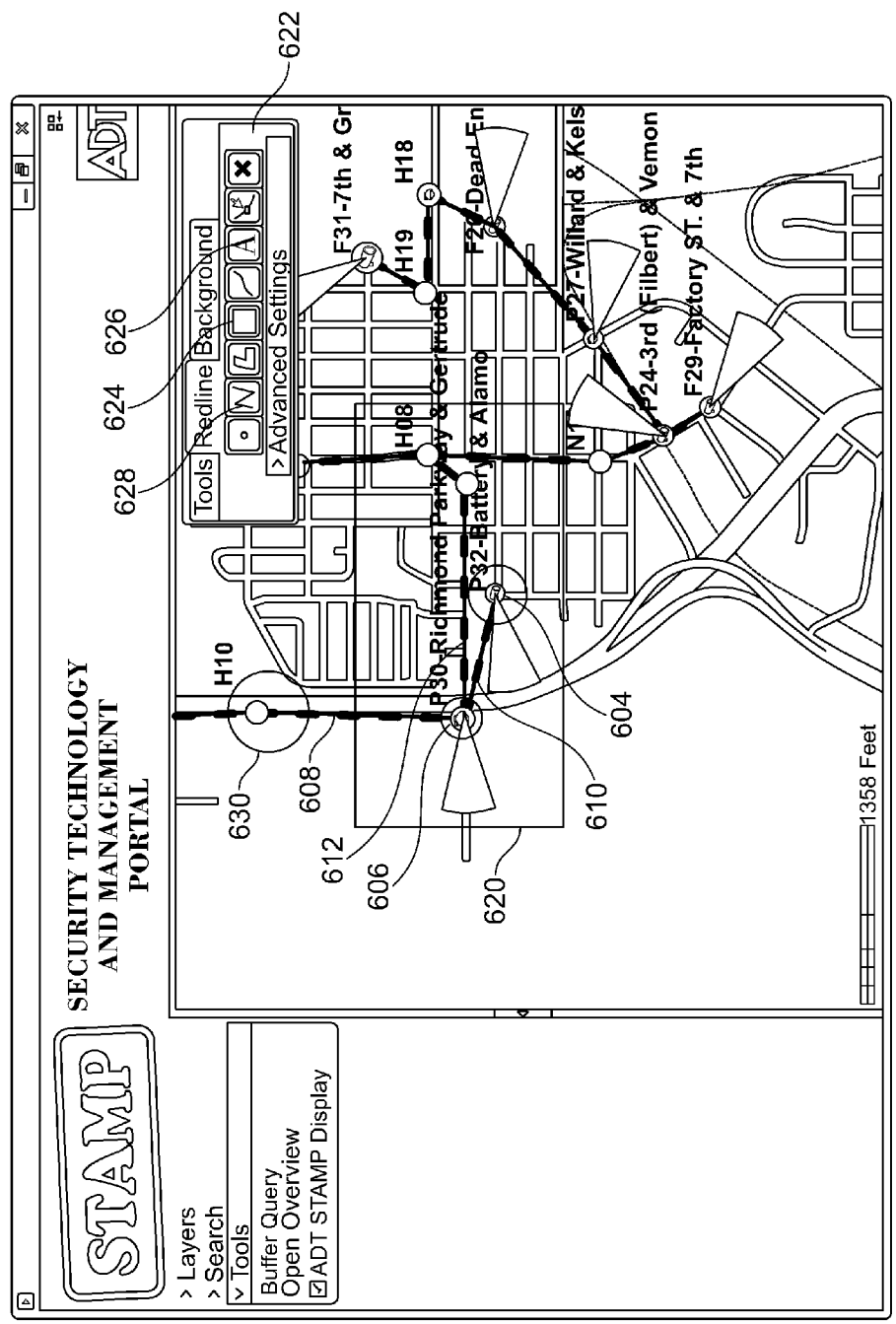
FIG. 6 illustrates a map on which selected nodes have been changed to an off-line state in accordance with an embodiment of the present invention.

FIG. 6 illustrates the map 202, on which selected nodes have been changed to an offline state. In FIG. 6, the nodes at 604 and 606 have been changed to an offline state. The communications links 608, 610 and 612 have been changed to reflect the new condition of the communications links as being offline. By way of example, the communications links may be shown with red indicia to indicate the nodes are no longer communicating with one another.

The user is presented with a redline toolbar 622. From the redline toolbar 622, the user may select various redline options, such as drawing a box around a desired area by selecting icon 624. A selected box 620 is shown which has been drawn around a desired area. In addition, the user may enter text by selecting icon 626. The user may perform freehand drawing by selecting icon 628 and then drawing a freehand line 630.

Figure 7:
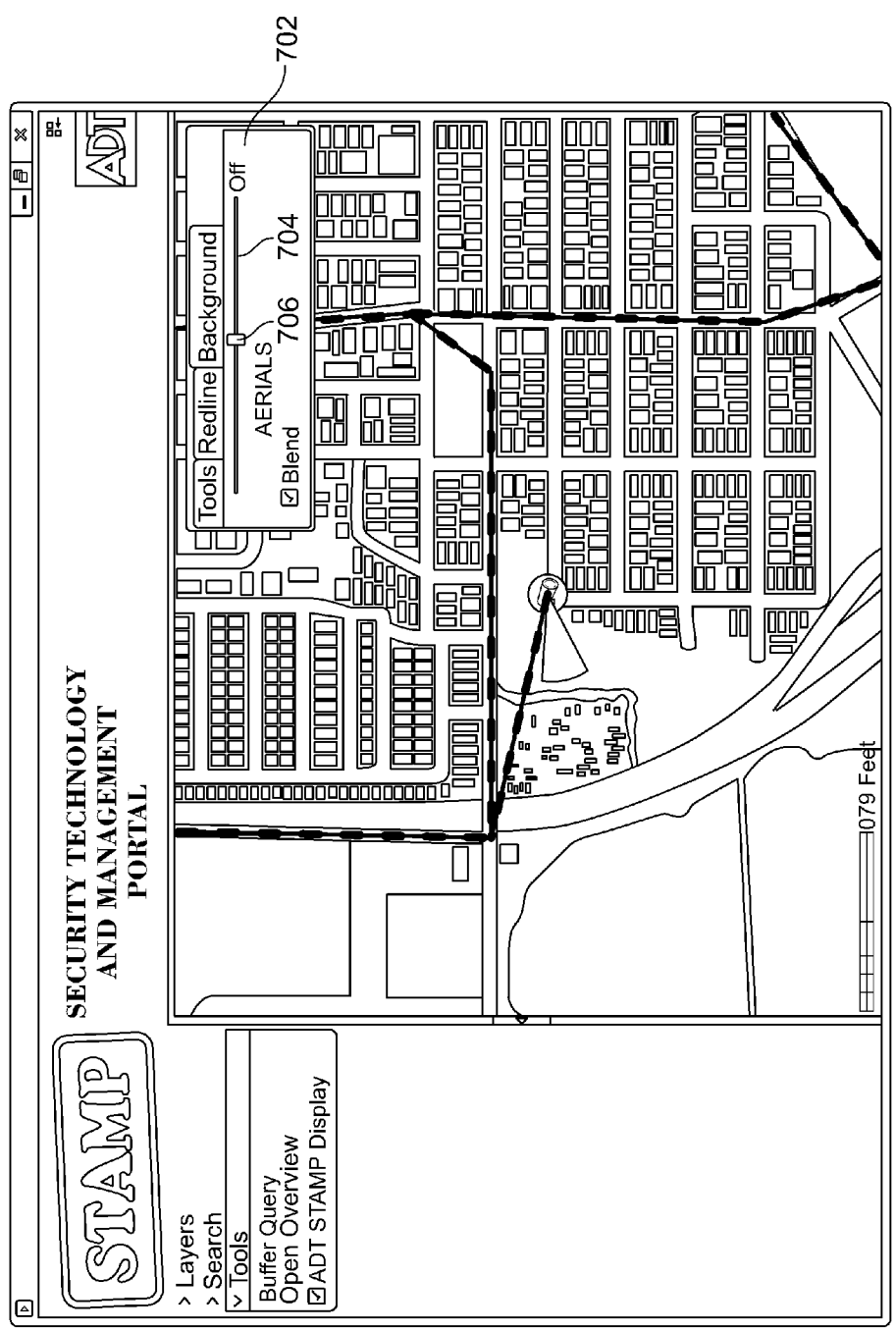
FIG. 7 illustrates a map with a background blending window in accordance with an embodiment of the present invention.

FIG. 7 illustrates the map 202 with a background blending window 702 open. The background blending window 702 includes a slide bar 704 and a tab 706. The user may adjust the content of the background blending window 702 by sliding the tab 706. At one extreme, only a roadmap is illustrated. As the tab 706 is slid along the slide bar 704, aerial photographic information is blended in with the street map and the surveillance and network devices to illustrate a more complete geographic map with more detailed topological information.

Figure 8:
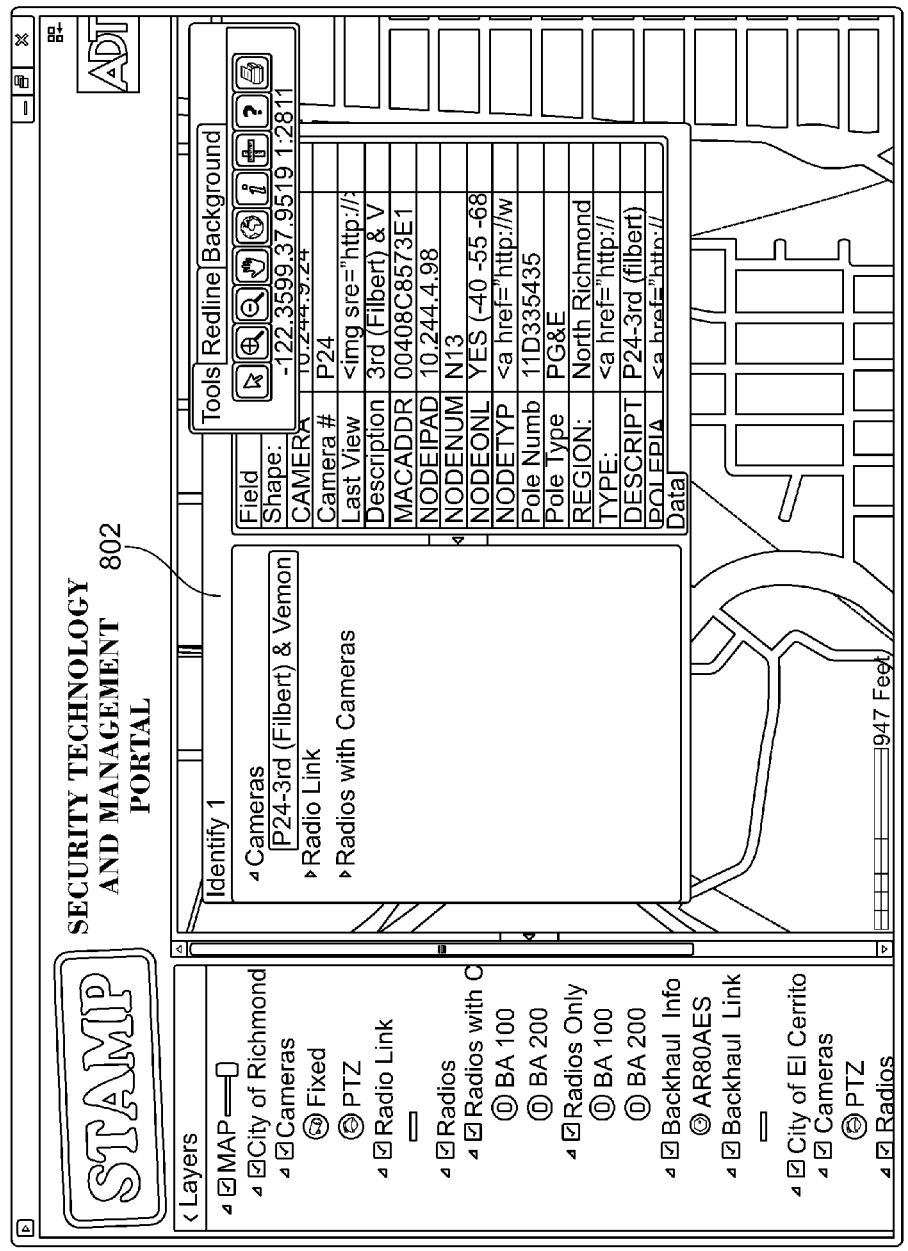
FIG. 8 illustrates a map with an identification window in accordance with an embodiment of the present invention.

FIG. 8 illustrates the map 202 with an identification window 802 pulled up in connection with an individual selected surveillance device. The window 802 includes a list of fields identifying attributes regarding the individual surveillance device. The fields may also list reference documents that are stored in connection with the individual surveillance device on the GI storage 186. The user may gain access to an individual document by selecting the document from window 802.

Figure 9:
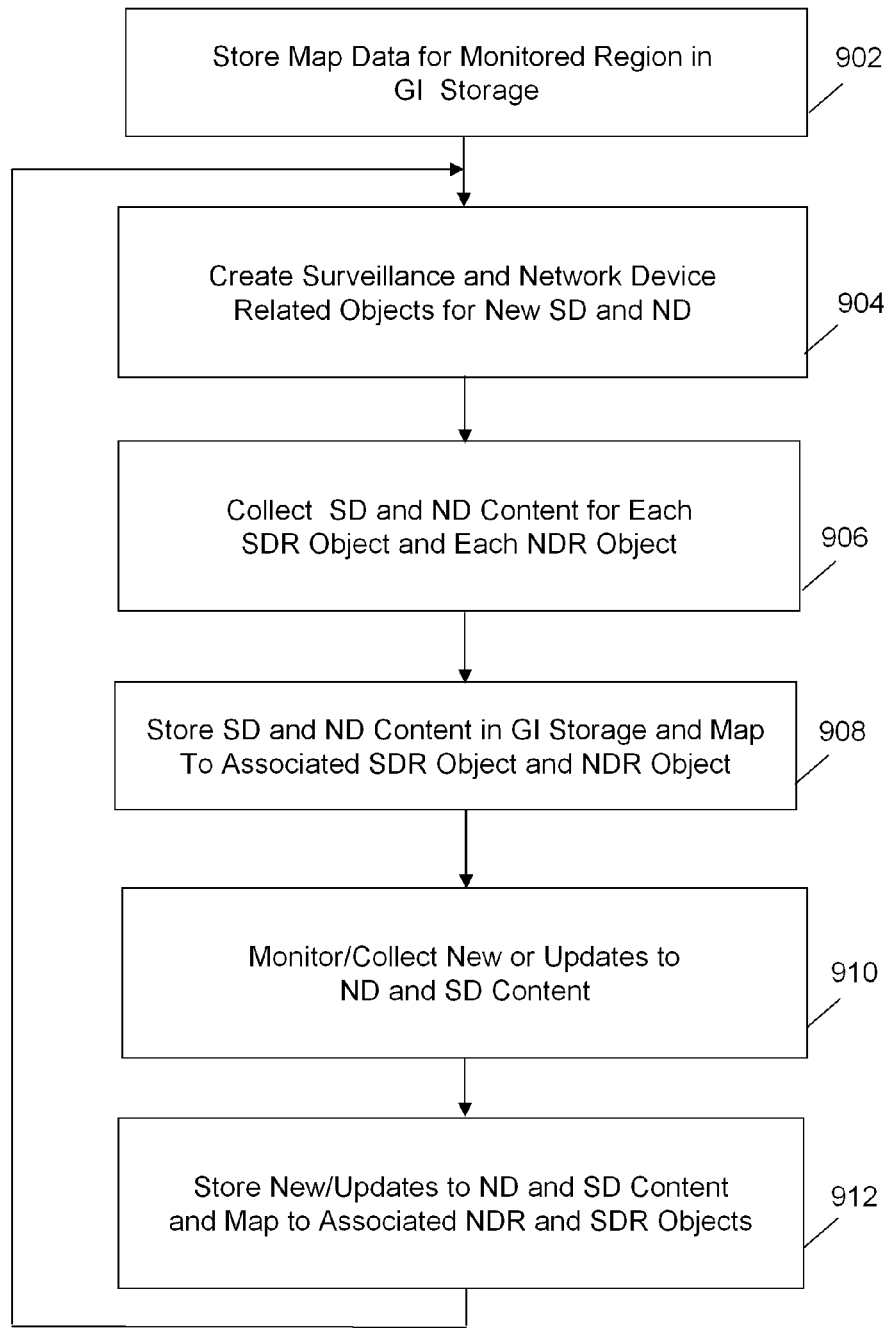
FIG. 9 illustrates a block diagram of a processing sequence carried out in accordance with an embodiment to collect, store and manage SD and ND content.

FIG. 9 illustrates a block diagram of a processing carried out in accordance with an embodiment to collect, store and manage SD and ND content. Beginning at 902, the process stores map data for a monitored region in the GI storage 186. At 904, the process creates surveillance device related objects and network device related objects (SDR and NDR objects) for each new SD or ND that has been added to the monitored region. The operation at 904 may be carried out periodically over a long period of time as new surveillance devices and new network devices are added to the monitored region. Similarly, the map data stored at 902 may be periodically updated or replaced as additional information is obtained or as alternative maps or maps sources are utilized.

At 906, the process collects SD and ND content for each SDR object and each NDR object, respectively. The architecture of the database in the GI storage 186 utilizes a unique SDR object for each surveillance device that is added to the monitored region. The database architecture similarly maintains, in the GI storage 186, a separate NDR object for each network device that is installed within the monitored region. The operation at 906 may be performed at various times over a long period of time. For example, when an initial group of surveillance and network devices are installed, content related thereto may be initially collected, saved in the GI storage 186 and mapped to the corresponding SDR object and NDR object. By way of example only, when a surveillance camera is mounted on a pole, an SDR object is created within the GI storage and uniquely associated with the surveillance camera. In addition, position information (such as geographic coordinates) is recorded in the GI storage and mapped to a SDR object. The position information represents SD position information as it identifies a location of the corresponding surveillance device in the monitored region. The position information is one example of surveillance device content that may be stored in the GI storage 186. Other examples of surveillance device content may include position information for assets (e.g., utility poles, buildings, traffic light poles, and the like) with respect to which surveillance devices are installed. For example, when a camera is installed on a traffic light pole, geographic coordinates may be recorded as position information for the traffic light pole asset. The geographic coordinates of the traffic pole are stored as another type of surveillance device content that is uniquely mapped to the SDR object associated with the camera. Other examples of surveillance device content include surveillance device data that is collected by a corresponding surveillance device such as video, still images, motion detection data, temperature information, and the like. Surveillance device content also includes surveillance device documentation describing the associated device, such as documentation related to installation, operation and maintenance of the surveillance device. Other examples of surveillance device content are described throughout the present application and included within the scope of surveillance device content. At 906, the surveillance device content may be collected at various times throughout operation and updated within the GI storage 186. At the time that content updates are added, the updated information is mapped back to the corresponding SDR object.

At 906, the process also collects network device content for each network device within the monitored region. The network device content may include network device position information that identifies a location of the corresponding network device in the monitored region. The network device content may also include asset position information, identifying a location for a corresponding asset with respect to which a network device is installed. The network device content may also include ND data collected by corresponding network devices, as well as ND documentation describing, among other things, installation, operation and maintenance of the corresponding network device.

At 908, the SD and ND content are stored in the GI storage 186 and mapped to the associated SDR object and NDR object, respectively. At 910, the process repeatedly monitors and collects new or updates to the ND and SD specific content. For example, at 910 the process may update video segments or still images that are collected in connection with a camera. As another example, new or updates to the bandwidth capacity, utilized bandwidth, signal quality, sensitivity and other network information may be collected and stored as ND content for a particular network device. At 912, the new or updated ND or SD content are stored in the GI storage 186 and mapped to the associated NDR or SDR objects. The process of FIG. 9 is continuously repeated over a long period of time, such as several months or years to provide historic and the most recent information associated with each surveillance and network device.

Figure 10:
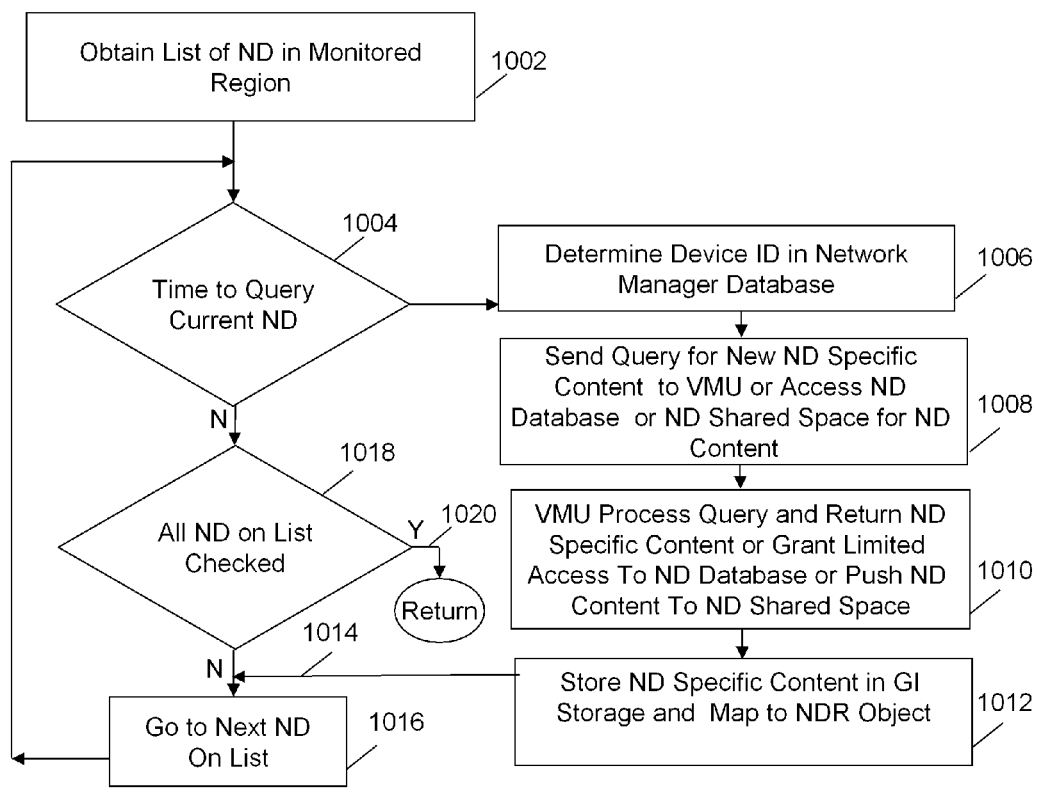
FIG. 10 illustrates a processing sequence carried out in accordance with an embodiment for updating content associated with surveillance devices.

FIG. 10 illustrates a processing sequence carried out in accordance with an embodiment for updating content associated with surveillance devices. Beginning at 1002, the process obtains a list of surveillance devices within the monitored region. At 1004, the process begins stepping through each surveillance device within the monitored region to determine whether it is appropriate to perform a query to obtain new content for the current surveillance device. For example, with video cameras, the GIMU 180 may obtain new video segments at a predetermined periodic interval. Alternatively, the GIMU 180 may obtain new video segments each time a particular camera is moved, such as zoomed in or panned. Alternatively, new video segments may be obtained each time another type of triggering event occurs (e.g., another device detects a triggering event signal such as a car passing through an intersection or a particular type of event occurring). Optionally, the GIMU 180 may submit queries at a predetermined periodic interval. When at 1004, it is determined that new content should be collected in connection with the current surveillance device, flow passes to 1006 where the device ID is determined. The VMU 152 manages the surveillance devices within the monitored region 110 based on a unique ID associated with each surveillance device. The IDs used by the VMU 152 may be assigned by the VMU 152 and may be the same as, or different from, the IDs utilized by the GIMU 180. When the VMU 152 utilizes a separate identification than the IDs used by the GIMU 180, at 1006, the process maps the SDR object to the device ID utilized by the VMU 152.

At 1008, the GIMU 180 sends a query to the VMU 152 to request new content (e.g., such as a most recent video segment obtained for the selected surveillance device). Alternatively, at 1008, the GIMU 180 may directly access the SD database 162 to obtain the most recent video segment. As a further option, a separate SD shared space may exist, within the SD database 162, within the GI storage 186 or elsewhere over the internet 170. The VMU 152 may push video segments to the SD shared space and write over these video segments periodically. The GIMU 180 may access the SD shared space to obtain the most recent video segments before such segments are written over. While the foregoing example is described in the context of obtaining video content, it should be recognized that a similar process may be followed for any type of SD content, such as still images, motion detection information, as well as other surveillance content. At 1010, the video management unit 152 processes a query and returns the current SD content. Alternatively, the VMU 152 may grant limited access by the GIMU 180 into the SD database 162 to directly collect SD content. Alternatively, the VMU 152 may push a selected video segment, still images or other surveillance information to a SD shared space in response to specific queries from the GIMU. The GIMU 180 may then collect the SD content from the SD shared space once the VMU 152 has pushed the content for the desired surveillance device to this shared space. At 1012, the GIMU 180 stores the SD content in the GI storage 186 and maps this new updated content to the SDR object for the current surveillance device. After the operation at 1012, flow moves along path 1014. At 1016, the process increments to the next surveillance device on the list and flow returns to 1004.

Returning to 1004, once it is determined that it is not time to query the current surveillance device for new content, flow moves to 1018. At 1018, it is determined whether all of the surveillance devices on the list for the monitored region have been checked. If not, flow moves to 1016 and the process increments to the next surveillance device. Once all of the surveillance devices are checked, flow moves along 1020 and returns to the overall process.

Figure 11:
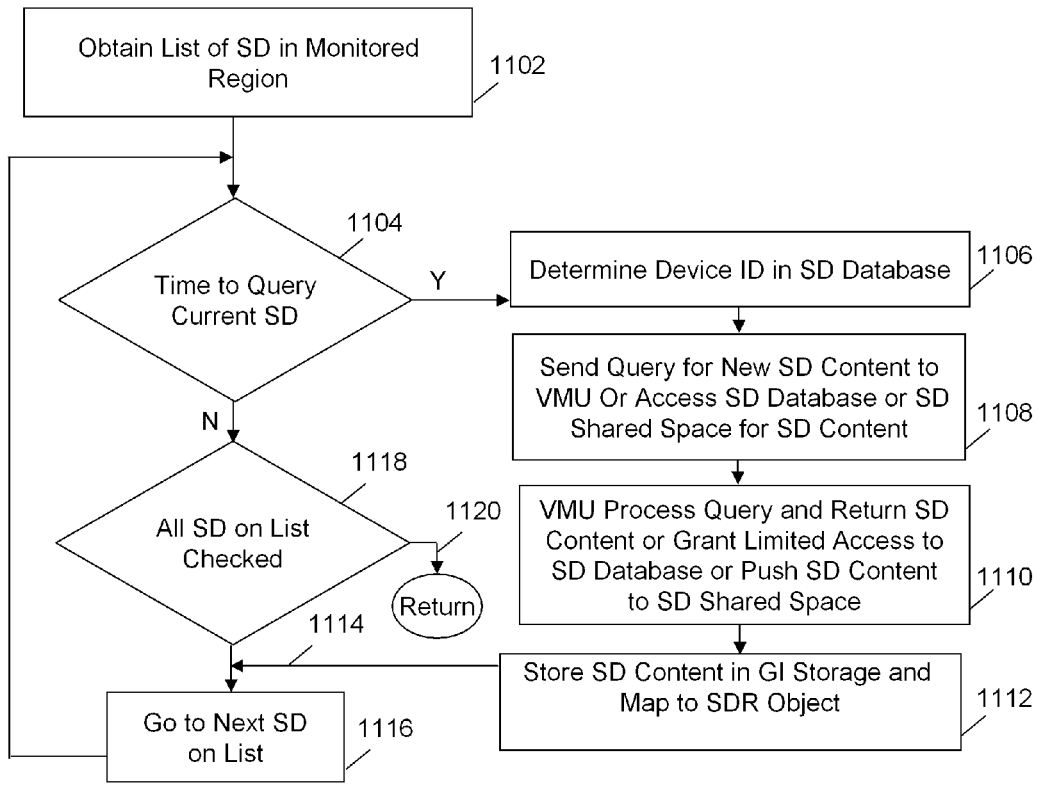
FIG. 11 illustrates a processing sequence carried out in accordance with an embodiment for updating content associated with network devices.

FIG. 11 illustrates a processing sequence carried out in accordance with an embodiment for updating content associated with network devices. Beginning at 1102, the process obtains a list of network devices within the monitored region. At 1104, the process begins stepping through each network device within the monitored region to determine whether it is appropriate to perform a query to obtain new content for the current network device. For example, the GIMU 180 may obtain new link status at a predetermined periodic interval. When, at 1104, it is determined that new content should be collected in connection with the current network device, flow passes to 1106 where the device ID is determined. The VMU 152 manages the network devices within the monitored region 110 based on a unique ID associated with each network device. The IDs used by the NMU 151 may be assigned by the NMU 151 and may be the same as or different from the IDs utilized by the GIMU 180. When the NMU 151 utilizes a separate identification system than the IDs used by the GIMU 180, at 1106, the process matches the ND or object to the device ID utilized by the NMU 151.

At 1108, the GIMU 180 sends a query to the NMU 151 to request new content (e.g., such as a most recent signal quality, bandwidth usage, etc. for the selected network device). Alternatively, at 1108, the GIMU 180 may directly access the NW database 161 to obtain the most recent device or link status. As a further option, a separate NW shared space may exist, within the NW database 161, within the GI storage 186 or elsewhere over the internet 170. The NMU unit 151 may push network content to the NW shared space and write over the network content periodically. The GIMU 180 may access the NW shared space to obtain the most recent network content before such network content are written over. While the foregoing example is described in the context of obtaining network content, it should be recognized that a similar process may be followed for any type of ND content.

At 1110, the NMU 151 processes a query and returns the current ND content. Alternatively, the VMU 152 may grant limited access to the GIMU 180 into the NW database 161. Alternatively, the NMU 151 may push content to an ND shared space in response to specific queries from the GIMU. The GIMU 180 may then collect the ND content from the NW shared space once the NMU 151 has pushed the content for the desired network device to this shared space. At 1112, the GIMU 180 stores the ND content in the GI storage 186 and maps this new updated content to the NDR object for the current network device. After the operation at 1112, flow moves along path 1114. At 1116, the process increments to the next network device on the list and flow returns to 1104.

Returning to 1104, once it is determined that it is not time to query the current network device for new content, flow moves to 1118. At 1118, it is determined whether all of the network devices on the list for the monitored region have been checked. If not, flow moves to 1116 and the process increments to the next network device. Once all of the network devices are checked, flow moves along 1120 and it returns to the overall process.

Figure 12:
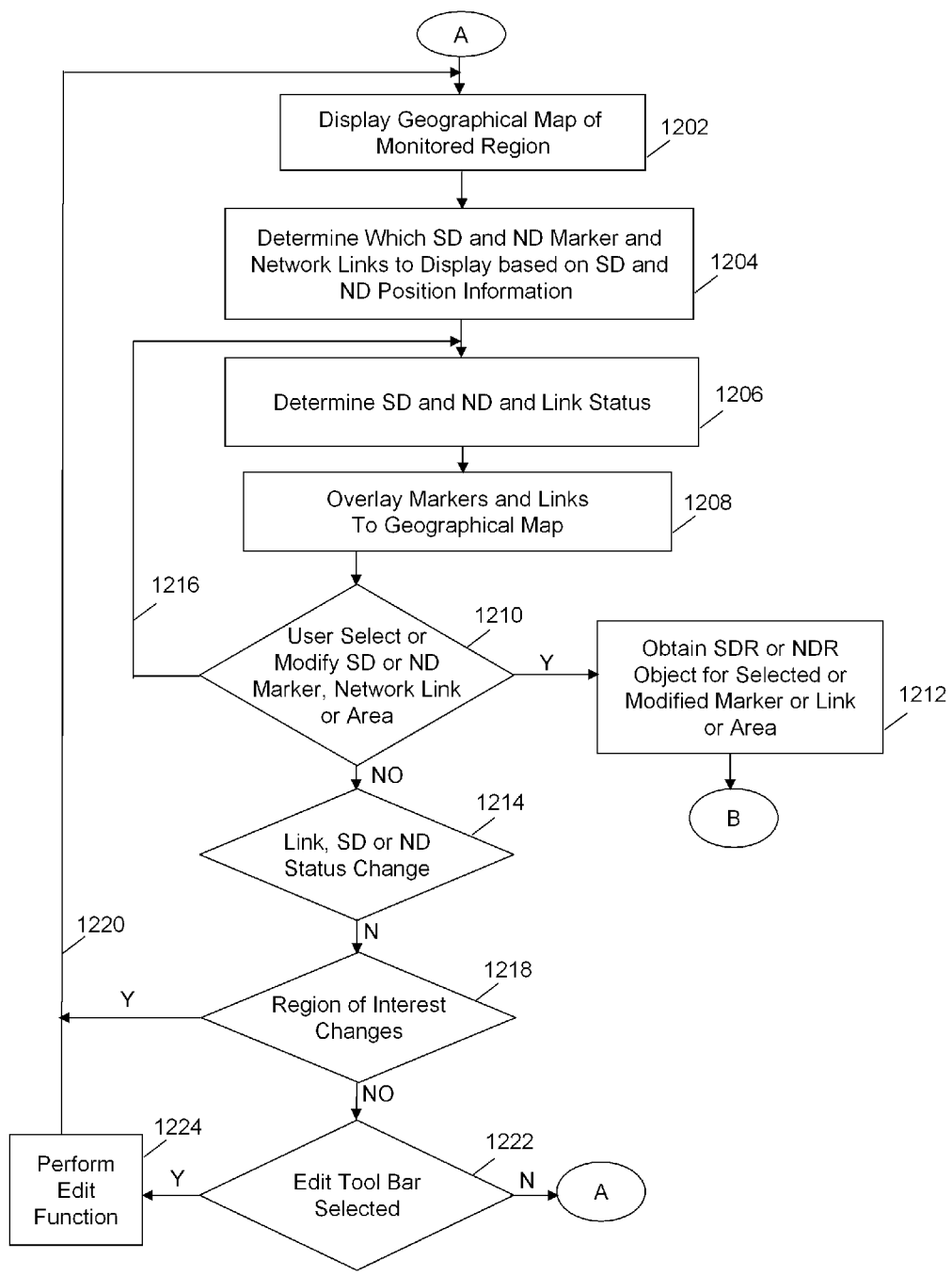
FIG. 12 illustrates a process carried out while a user is reviewing geographic information, device markers and network links on a graphic user interface and selecting various devices to manage.

FIG. 12 illustrates a process carried out while a user is reviewing geographic information, device markers and network links on a graphic user interface. Beginning at 1202, a graphical map is pulled from the GI storage 186 and displayed for all or a portion of the monitored region. At 1204, the GIMU 180 determines which SD and ND markers and network links should be shown based on the position information for the surveillance devices and network devices and the boundaries of the displayed region. For example, when the user has selected to view a portion of the monitored region that is only four or five blocks square, at 1204, markers and links for the surveillance and network devices, within the four or five block area, would be designated to be listed. Next, at 1206, GIMU 180 determines a current status of each of the surveillance devices, network devices and links.

At 1208, this status information is overlayed with the markers and links onto the geographic map. For example, referring to FIG. 3, the operations at 1204 to 1208 identify each of the devices at nodes N12, P24, F29, P27 and F32, as well as the links therebetween. The status information determined at 1206 is used to determine which color to highlight the links between the network devices. Color may also be used to indicate the status of a device, such as to indicate whether it is on-line or off-line, and the like. As a further example, with reference to FIG. 4, the SD markers may include camera condition indicia 406 which indicate the direction in which a camera is pointed as well as the field of view for the camera. In the example of FIG. 4, a portion of the indicia 406 have no border indicating that the camera is the type of camera that can be moved, such as panned, zoomed and tilted. Other indicia 406 include a dark black border, thereby indicating that the corresponding camera is a stationary camera that cannot be adjusted in pan, zoom or tilt.

Returning to FIG. 12, once the map, markers, links and statuses are displayed in an overlapped manner, the process monitors the user interface at 1210 to determine whether the user selects one of the markers or network links (by clicking on it, hovering over it, or otherwise). At 1210, the process also determines if the user selects an area that may include multiple markers or links. When the user selects or tries to modify a marker, network link or area, flow moves to 1212. At 1212, the GIMU 180 obtains the SDR or NDR object for the marker, link or area that the user has selected or wishes to modify. Next, flow moves to point B which is described further in connection with FIG. 13.

Returning to 1210, when the user does not select a marker, network link or area, nor wish to modify one, flow moves to 1214. At 1214, it is determined whether the status of a surveillance device, network device or link has changed. When the status changes for a displayed surveillance or network device or link, flow moves along 1216 where the operations at 1206-1210 are repeated. When the status remains constant at 1214, flow moves to 1218. At 1218, it is determined whether the user has changed the region that is displayed, such as when the user wishes to view a different region of interest. When the user changes the region of interest displayed, flow moves along 1220 where a new graphical map is obtained at 1202 for the newly selected monitored region or portion of a monitored region. After 1202, the operations of 1204-1210 are repeated.

Returning to 1218, when the region of interest does not change, it is next determined whether the user has selected an edit toolbar. When the user selects the edit toolbar at 1222, the edit functions are performed at 1224 after which flow moves along 1220. The operations of FIG. 12 are continuously repeated to obtain new information and update the display as the user selects various markers and network links, thereby facilitating management of the surveillance and network devices through a geographic information portal.

Figure 13:
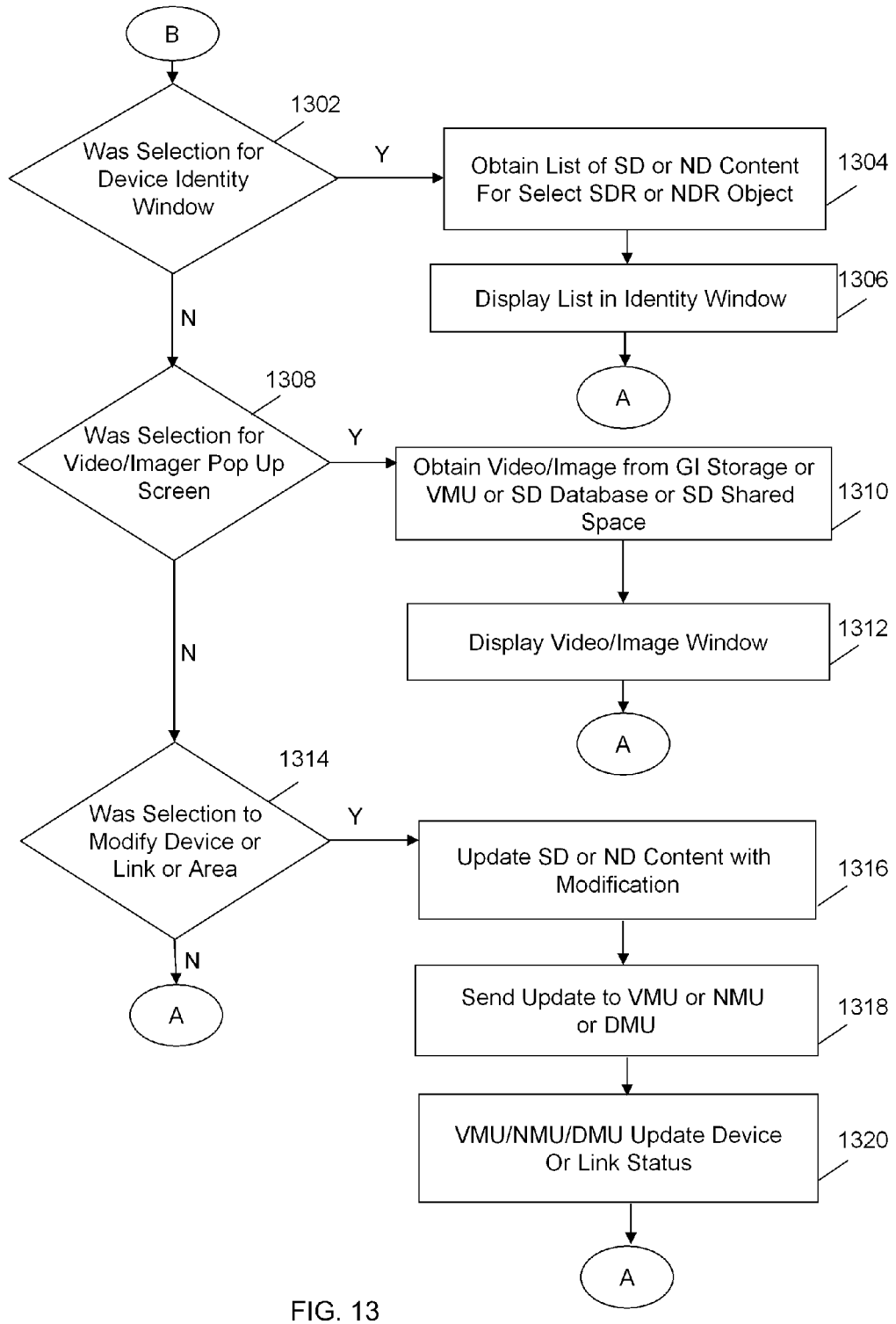
FIG. 13 illustrates, in more detail, the process performed when the user wishes to select or modify an SD or ND marker, a network link or an area.

FIG. 13 illustrates, in more detail, the process performed when the user wishes to select or modify an SD or ND marker, a network link or an area. Beginning at 1302, it is first determined whether the user has selected to view a device identity window. When the device identity is selected Yes, flow moves to 1304 where the GIMU 180 accesses the database 186 to obtain the list of SD or ND content for the selected SDR or NDR object. For example, with reference to FIGS. 3 and 8, it may be determined at 1302 that the user has selected the surveillance device P24 by clicking on the node associated therewith and illustrated in FIG. 3. The GIMU 180 determines the SDR object associated with node P24 and obtains, at 1304, the list of SD content that has been mapped to the SDR object for node P24. At 1306, an identity window is displayed (802 in FIG. 8) that illustrates a list of the various types of surveillance device content that have been saved within the GI storage and mapped to the SDR object associated with camera P24. In the example of FIG. 8, the identity window illustrates a list of attributes associated with the individual surveillance camera, as well as a list of reference documents that have been stored within the GI storage for the individual camera. These documents include, among other things, documents that define the operation, performance and capabilities of the camera, as well as documents used by various personnel to install, maintain and operate the device. For example, the documents may include device specifications, operational parameters, maintenance information, installation instructions, repair information, and the like.

Returning to 1302, when the device identity is not selected, flow moves to 1308. At 1308, it is determined whether the user has selected to view a video or image pop up screen. For example, when the SD device is a still or video camera, the user may click on the corresponding node (e.g., node P32 in FIG. 4). When the user selects to view an image or video, flow moves to 1310 where the GIMU 180 obtains video or images from the GI storage 186. Alternatively, when video or images are not stored in the GI storage 186, the GIMU 180 may request the still images or video segments from the video management unit 152. Optionally, the GIMU 180 may directly access the SD database 162 and pull directly from the SD database the desired video segment or segments. As a further option, the GIMU 180 may go to an SD shared space to obtain the desired video or still image. Next, at 1312, the video or image is displayed in a window. For example, as shown in FIG. 5, a video or image 510 may be displayed in window 512 for the camera at node P32. Thereafter, flow returns to point A in FIG. 12.

Returning to 1308, when it is determined that the user has not selected an image or video pop up screen, flow moves to 1314. At 1314, it is determined whether the user has selected to modify the status of a device, the status of a link or to modify an area. When the user selects to perform a modification at 1314, flow moves to 1316. At 1316, the GIMU 180 updates the surveillance device or network device content with the modification. The content may be stored locally on the GI storage 186 or the GIMU 180 may have direct access to the location at which the SD or ND content is stored. When the GIMU 180 does not have direct access to the stored content, the GIMU sends a request at 1318 to the appropriate manager of such content. For example, when the user requests to adjust the direction in which a camera is pointed, this modification may be sent by the GIMU 180 to VMU 152 which then implements the pan, zoom or tilt as requested to adjust position of the camera. Optionally, when the user selects to change the status of a network device, such as turning a network device On or Off or adjusting the operation of a network link, the GIMU 180 may directly update the local ND content stored in the GI storage 186 (at 1316). The GIMU 180 will also send the request to update the network device or network link to the NMU 151 which then may directly perform the update to the status of the corresponding network device or network link. At 1320, the VMU 152 performs a requested update, the NMU 151 performs a requested update and the DMU 150 performs requested updates for surveillance and network devices as well as network links. Thereafter, flow returns to point A in FIG. 12.

Returning to the decision at 1314, when it is determined that there has been no selection to modify a device or a network link or an area, flow returns to point A in FIG. 12. The operation of FIGS. 12 and 13 are iteratively performed to facilitate management of the surveillance and network devices through a series of windows presented on the geographic information portal displayed on the user interface as shown in FIGS. 2-8.

In accordance with the embodiments described herein, a database is provided to facilitate management of network devices that are distributed over a monitored region, through a geographic information (GI) portal. The database comprises map data defining a geographic map of the monitored region, in which assets of interest are located and in which surveillance devices (SDs) and network devices (NDs) are installed relative to the assets of interest. The database further comprises surveillance device related (SDR) objects in the GI storage, wherein each of the SDR objects is uniquely associated with one of the SDs. The database further comprises network device related (NDR) objects, wherein each of the NDR objects uniquely associated with one of the NDs. The database further comprises network device content mapped to the NDR objects and surveillance device content mapped to the SDR objects.

The surveillance device content includes at least one of the following: i) SD position information regarding a location of the corresponding surveillance device in the monitored region; ii) asset position information regarding a location for the corresponding asset with respect to which the SD is installed; iii) SD data collected by the corresponding SD; and iv) SD documentation describing at least one of installation, operation, and maintenance of the corresponding SD. The network device content includes at least one of the following: i) ND position information regarding a location of the corresponding network device in the monitored region; ii) asset position information regarding a location for the corresponding asset with respect to which the ND is installed; iii) ND data collected by the corresponding ND; and iv) ND documentation describing at least one of installation, operation, and maintenance of the corresponding ND.

The database further comprises device markers associated with the map data, the device markers configured to be illustrated on the geographic map to indicate positions of the surveillance devices relative to the geographic map, the device markers mapped to the SDR objects. At least one of the surveillance and network device content includes documents and attributes that define operation, performance and capabilities of the corresponding network or surveillance devices. The attributes include device identification information, device-generated content, device-status information, device-service history. At least one of the surveillance and network devices content includes documentation having one or more of documents used by emergency services personnel, water services, sewage services, waste management, utilities and engineering documents. At least one of the surveillance and network devices content includes at least one of device specific information about a corresponding type of device, device specifications, operational parameters, maintenance information, installation instructions, and repair information.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A method to facilitate management of surveillance devices, that are distributed over a monitored region, through a geographic information (GI) portal, comprising:
   storing map data defining a geographic map of the monitored region, in which assets of interest are located and surveillance devices (SDs) are installed relative to the assets of interest;
   creating and storing surveillance device related (SDR) objects in the GI storage, each of the SDR objects uniquely associated with one of the SDs;
   repeating the creating and storing operation for at least one new SD added to the monitored region;
   mapping the SDR objects to surveillance device specific content that includes at least one of the following:
      i) SD position information regarding a location of the corresponding surveillance device in the monitored region;
      ii) asset position information regarding a location for the corresponding asset with respect to which the SD is installed;
      iii) SD data collected by the corresponding SD;
      iv) SD documentation describing at least one of installation, operation, and maintenance of the corresponding SD;
   presenting a geographic map of the monitored region with device markers illustrated thereon, the device markers indicating positions of the surveillance devices relative to the geographic map, the device markers mapped to the SDR objects; and
   providing a user interface to permit a user to select from the surveillance devices by choosing the corresponding device markers, a geographic information manager unit (GIMU) making available to the user the device content associated with the SDR object for the selected surveillance device.

2. The method of claim 1, further comprising storing SD content associated with surveillance devices installed throughout the monitored region, managing the SD database, and submitting a query for SD content associated with a selected surveillance device.

3. The method of claim 2, further comprising communicating with the surveillance devices installed in the monitored region, collecting surveillance, status, and condition data from the surveillance devices and recording the surveillance, status and condition data.

4. The method of claim 1, further comprising utilizing the SDR object for a selected surveillance device to access the surveillance device content.

5. The method of claim 1, further comprising collecting information that describes surveillance devices including at least one of device attributes and warranty, and collecting information describing network devices installed relative to assets of interest including at least one of installation manuals, specifications, operational parameters, device attributes, and warranties.

6. The method of claim 1, further comprising collecting information that describes maintenance history for at least one of devices, networks, and assets, and collecting operational information that describes at least one of a status, condition, and operating parameters of the devices and network.

7. The method of claim 1, further comprising the user interface permitting the user to zoom in the geographic map to a particular monitored subregion, the display displaying the subregion along with a group of nodes having surveillance devices and network devices installed relative to the assets of interest.

8. The method of claim 1, further comprising within the GI storage layers of information corresponding to architectural layers for a network including the SDs and network devices (NDs).

9. The method of claim 1, further comprising a display presenting a network control area including a layer menu having a layer structure associated with the different layers of information stored in the GI storage.

10. A method to facilitate management of network devices, that are distributed over a monitored region, through a geographic information (GI) portal, comprising:
   storing map data defining a geographic map of the monitored region, in which assets of interest are located and network devices (NDs) are installed relative to the assets of interest;
   creating and storing network device related (NDR) objects in a GI storage, each of the NDR objects uniquely associated with one of the NDs;
   repeating the creating and storing operation for at least one new ND added to the monitored region;
   mapping the NDR objects to network device content that includes at least one of the following:
      i) ND position information regarding a location of the corresponding network device in the monitored region;
      ii) asset position information regarding a location for the corresponding asset with respect to which the ND is installed;
      iii) ND data collected by the corresponding ND;
      iv) ND documentation describing at least one of installation, operation, and maintenance of the corresponding ND;
   presenting a geographic map of the monitored region with device markers and network links illustrated thereon, the device markers indicating positions of the network devices relative to the geographic map, the network links illustrating communications paths between network devices, the device markers and network links mapped to the NDR objects;
   permitting a user to select from the network devices or network links by choosing the corresponding device markers or network links; and
   making available to the user the device content associated with the NDR object for the selected network device or network link.

11. The method of claim 10, further comprising storing ND content associated with network devices installed throughout the monitored region, managing the ND database, and submitting a query for ND content associated with a selected network device.

12. The method of claim 11, communicating with the network devices installed in the monitored region, collecting communications, surveillance, status, and condition data from the network devices and recording the communications, surveillance, status and condition data in the ND database.

13. The method of claim 10, further comprising utilizing the NDR object for a selected network device to access the network device content.

14. The method of claim 10, further comprising accessing a network (NW) database which stores network device content associated with network devices installed throughout the monitored region, the network device content including attributes that define operation, performance and capabilities of the corresponding devices.

15. The method of claim 10, further comprising communicating with the network devices installed in the monitored region, collecting network device content from the network devices, recording the network device content in a network (NW) database, and requesting the network device content.

16. The method of claim 10, further comprising the GI storage storing information regarding network devices that are installed relative to the assets of interest, the network devices bidirectionally communicating with one another over links to carry surveillance device content and network device content.

17. The method of claim 10, further comprising the user interface permitting the user to zoom in the geographic map to a particular monitored subregion, the display displaying the subregion along with communications links between network devices installed relative to the assets of interest, the communications links indicating at least one of a communications link status or a type of link.

* * * * *